UNITED STATES PATENT OFFICE.

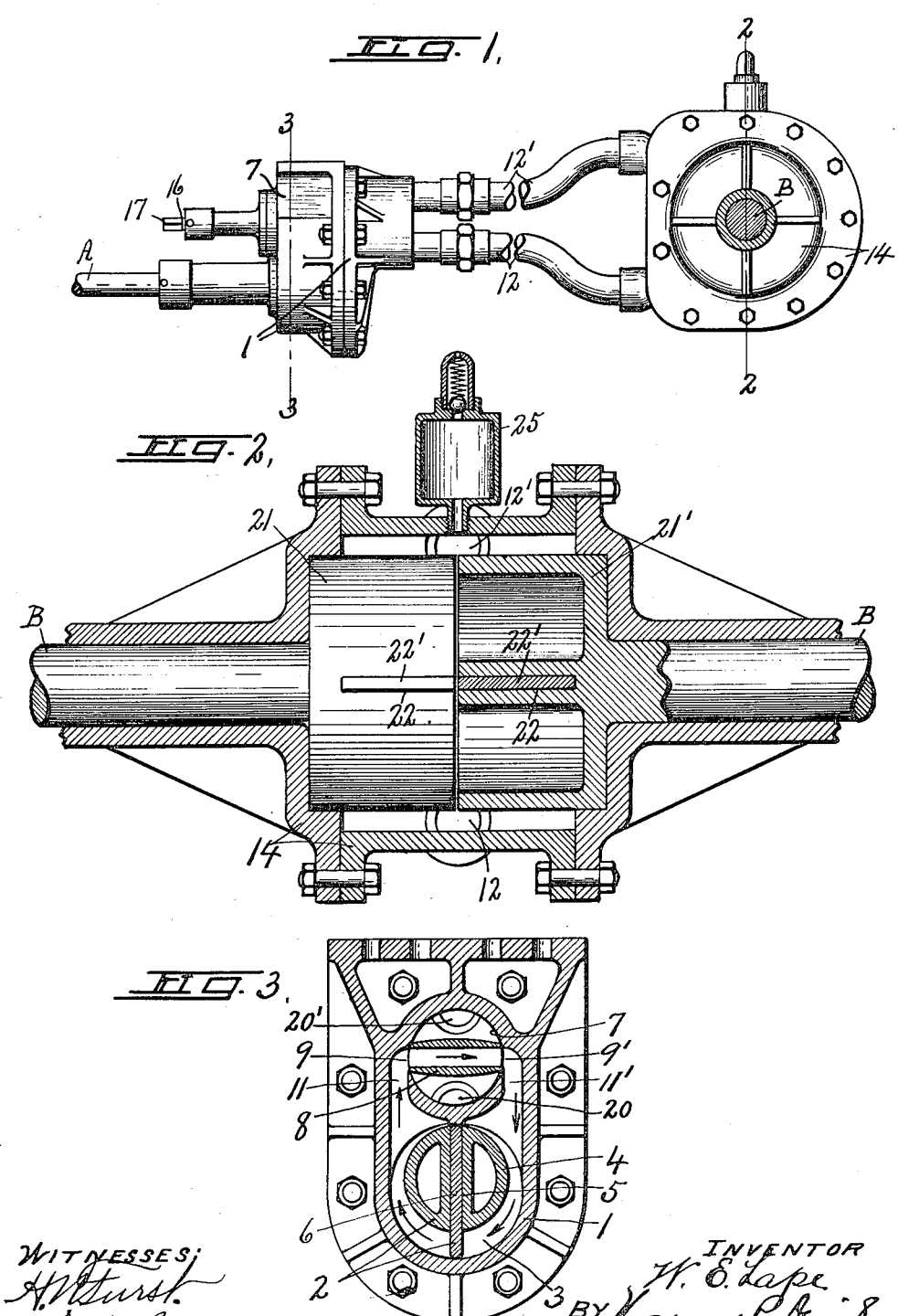

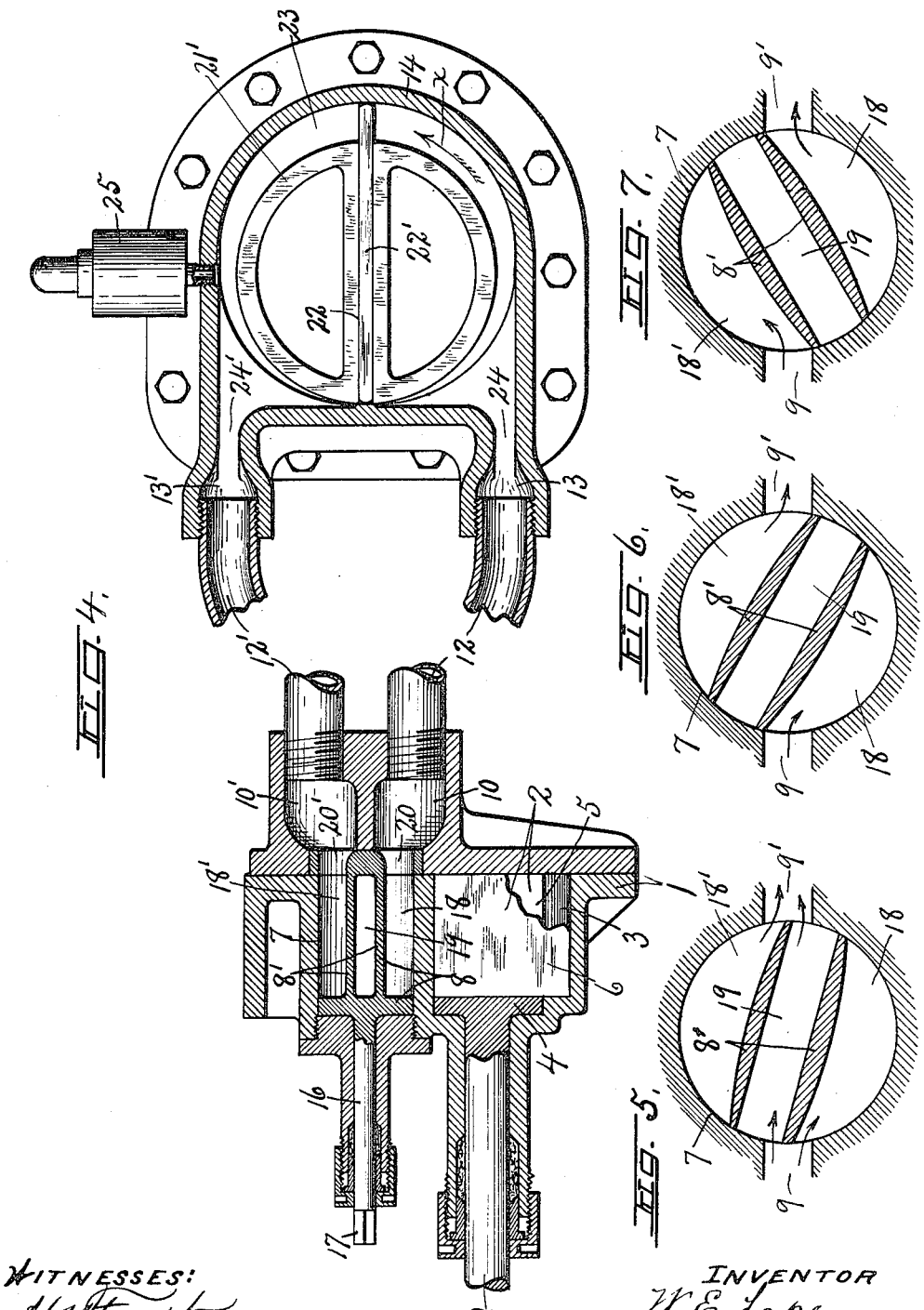

WILLARD E. LAPE, OF SYRACUSE, NEW YORK, ASSIGNOR OF ONE-HALF TO WILLIAM J. LEWIS, OF SYRACUSE, NEW YORK.

POWER-TRANSMITTING MECHANISM FOR MOTOR-VEHICLES.

1,235,817. Specification of Letters Patent. Patented Aug. 7, 1917.

Application filed June 29, 1914. Serial No. 847,960.

*To all whom it may concern:*

Be it known that I, WILLARD E. LAPE, of Syracuse, in the county of Onondaga, in the State of New York, have invented new and useful Improvements in Power-Transmitting Mechanism for Motor-Vehicles, of which the following, taken in connection with the accompanying drawings, is a full, clear, and exact description.

This invention relates to certain improvements in power-transmitting mechanism for motor-vehicles and is somewhat similar to that set forth in my Patent No. 1,168,206, issued January 11, 1916, and also in my pending application No. 59,101, filed November 1, 1915, except that it combines a hydraulic differential drive mechanism with the hydraulic transmission for use in connection with motor-driven road vehicles.

The main object, of course, is to obviate the use of the usual gears, shaft and universal joints commonly employed in the connection between the motor-shaft and propelling medium, such for example, as the axle sections and traction wheels of a motor-driven road vehicle.

Another object is to enable the vehicle to be driven in either direction at any speed between zero and maximum speed of the main driving motor, or brought to a position of rest by cutting off the fluid supply to the axle motors and establishing a local circulation around the impeller all through the medium of a single valve under the control of the operator.

A still further object is to provide for the differential speed movements of the traction wheels and their axle sections in rounding curves without adding any mechanism more than is necessary to transmit rotary motion to both axle sections simultaneously.

Other objects and uses relating to specific parts of the device will be brought out in the following description.

In the drawings—

Figure 1 is a side elevation of a hydraulic power-transmitting mechanism embodying the various features of my invention as applied to motor-driven road vehicles.

Fig. 2 is an enlarged longitudinal sectional view of the differential motors for the rear axle sections and inclosing case therefor taken on line 2—2, Fig. 1.

Fig. 3 is a transverse vertical sectional view through the impeller and valve case constituting a variable-speed-transmission device, taken on line 3—3, Fig. 1.

Fig. 4 is an enlarged longitudinal vertical sectional view of the parts shown in Fig. 1.

Figs. 5, 6 and 7 are enlarged detail views of the valve-case and valve in different positions of adjustment.

In order that my invention may be clearly understood, I have shown a portion of a main driving shaft —A— and portions of the rear axle sections —B— of an automobile or other self-propelled road vehicle, the shaft —A— being adapted to be driven by an internal combustion engine or other primary motor and has its rear end journaled in the front side of a variable-speed-transmission case —1— and provided with a rotary impeller —2— operating in a cylindrical chamber —3— which is eccentric to the axis of the shaft —A—, said impeller consisting of a head —4— having a diametrically extending slot —5— for receiving a radially movable gate —6— of substantially the same width and length as the diameter and length of the chamber —3—, while the head —4— extends the entire length of the chamber —3— and is cylindrical and of less diameter than that of the chamber so as to leave a clearance all around the head for the passage of the motive fluid.

The case —1— is also provided with a valve chamber —7— above and parallel with the impeller chamber —3— for receiving a rotarily adjustable valve —8—, said valve chamber being provided with diametrically opposite ports —9— and —9'— in the opposite sides thereof and with additional ports —10— and —10'— in the rear end of said case.

The ports —9— and —9'— communicate through passages —11— and —11'— with a clearance space at opposite sides of the impeller, the ports —10— and —10'— being connected by separate pipes or conduits —12— and —12'— to corresponding ports —13— and —13'— in the front side of a differential case —14— which surrounds the meeting ends of the axle sections —B—.

The valve —8— fits closely within the chamber —7— and is adjustable rotarily by means of a stem —16— having an angular end —17— for the reception of an operating member (not shown, but adapted to be controlled by the operator).

The ends of the valve are cylindrical and are journaled in corresponding portions of the case but the intermediate portion consists of a hollow diametrically extending web of substantially the same width as the interior of the chamber —7—, but of considerably less thickness than its width so as to leave clearance spaces —18— and —18'— at diametrically opposite sides thereof normally communicating with ports —10— and —10'— when the valve is closed, said web being provided with a central diametrically extending passage —19— normally communicating with the ports —9— and —9'— so as to establish a local circuit for the circulation of the motive fluid when the vehicle is at rest and the primary motor in operation.

The rear cylindrical end of the valve —8— is provided with ports —20— and —20'— at diametrically opposite sides of the web —8'— for connecting their respective chambers —18— and —18'— with their corresponding ports —10— and —10'—. It will be noted that the valve —8— divides its chamber —7— into separate compartments, each communicating with the motor chamber through the inlet and exit ports —20— and —20'—, one communicating with the port —20— and the other with the port —20'—, so that by proper adjustment of the valve, either compartment may be connected with either of the ports —9— or —9'— and the other compartment with the other of said ports, thereby establishing a more direct communication between the impeller chamber and the motor chamber for the passage of the motive fluid and permitting such fluid to circulate through the same passages for forward or reverse drive.

On the other hand when the valve is adjusted to an intermediate or neutral position, it cuts off communication between one set of ports, as —9'— and both compartments, and at the same time connects the two ports —9— and —9'— through the diametric passage in the valve.

The meeting ends of the axle sections —B— are provided with enlarged cylindrical heads —21— and —21'—, each having a diametrically extending slot —22— for receiving a diametrically extending gate —22'—, each head together with its sliding gate —22'— constituting a separate fluid motor to be actuated by the fluid passing through the pipes —12— and —12'—.

These motors are movable in a cylindrical motor chamber —23— common to both motors but of somewhat greater diameter than the same and eccentric thereto, the motors being so relatively arranged within the chamber —23— that their front sides contact with the front sides of the chamber leaving a clearance all the way around the motors gradually increasing from the front side to the rear side thereof, and communicating with the ports —13— and —13'— through passages —24— and —24'—.

The sliding gate —22'— of each motor is of substantially the same length as the interior diameter of the chamber —23— around which it is adapted to be moved by the circulation of the motive fluid under pressure produced by the impeller —2—.

The entire circulating system is filled with a motive fluid, preferably oil or some non-freezing inelastic fluid, so as to render the differential motors instantaneously responsive to the slightest movement of the fluid as produced by the action of the impeller —2— when the valve is shifted from its normal position.

The reservoir —25—, containing a reserved quantity of motive fluid, is connected to the circulatory system, preferably to the top of the differential case —14— for replenishing such system with motive fluid in case of leakage, it being understood that the pressure of the fluid in said system produced by the action of the impeller —2— causes a certain amount of air to be trapped in the reservoir which, in turn, reacts upon the reserved supply of motive fluid therein to project the same into the circulatory system in case of leakage.

When the valve —8— is in its normal position, as shown in Figs. 3 and 4, the impeller —2— is being driven by the primary motor through the medium of the driving shaft —A—, the motive fluid in the casing —1— will be circulated locally through the passage —19—, ports —9— and —9'— and passages —11— and —11'—, as for example, in the direction indicated by the arrows, Fig. 3, without effecting the movement of the fluid in the pipes —12— and —12'— and differential case —14— so that the motors on the axle sections —B— will remain at rest.

If, however, the valve is shifted to the position shown in Fig. 5, a part of the fluid will be circulated locally through the same channels while the remaining portion will be circulated through the port —9—, thence into the lower chamber —18— beneath the valve through the ports —20— and —10— and pipe —12— to the lower side of the motors on the axles —B—, thereby rotating said axles in the direction indicated by arrow —X—, Fig. 4, at a lower speed than that of the engine by reason of the local circulation of a part of the fluid.

It is therefore, apparent that the speed of rotation of the axle sections —B— and, therefore, the road speed of the machine can be varied from zero to the full speed of the engine by a greater or less degree of opening of the valve —19— from its normal position and that the machine will attain its highest speed for driving the machine ahead when shifted to the position shown in Fig. 6 in which both of the parts —9— and —9'— are cut off from communication with the passage —19— through the valve, said ports being then full open to allow circulation of all of the motive fluid from the port —9— to the chamber —18— below the valve and thence through the conduit —12— to the motors on the axles —B— as previously described.

On the other hand, if it is desired to reverse the direction of movement of the vehicle, it is simply necessary to reverse the operation of the valve to the position shown in Fig. 7 in which position, the circulation of the motive fluid will be from the port —9— into the chamber —18'— above the valve and thence through the upper pipe —12'— to the top of the motors on the axles —B— to cause the rotation of the latter in a direction opposite to that indicated by arrow —X—, it being understood that the motive fluid then returns through the pipe —12— to the chamber —18— at the lower side of the valve and thence to the impeller chamber at the downwardly moving side of the impeller which it follows and is again impelled through the port —9— to the valve-chamber at the upper side of the valve where the operation just described is repeated.

It is evident, however, that, in reversing the valve, it may be shifted to any intermediate position between its normal and full open positions for regulating the reverse speed of the vehicle to any desired degree.

What I claim is:

1. In hydraulic power transmission, the combination of a motor, an impeller, a valve chamber having a set of ports communicating with the impeller chamber, and a valve dividing said chamber into separate compartments which communicate with the motor, said valve being adjustable to connect either compartment with either port and the other compartment with the other port.

2. In hydraulic power transmission, the combination of a motor, an impeller, a valve chamber having a set of ports communicating with the impeller chamber, and a valve dividing said chamber into separate compartments which communicate with the motor, said valve being adjustable to one position to connect one compartment with one port and the other compartment with the other port, and to another position to connect the first-named compartment with the second-named port and the second-named compartment with the first-named port, and to a third position for cutting off communication between the compartments and ports.

3. In a hydraulic power transmission, the combination of a motor, an impeller, a valve chamber having a set of ports communicating with the impeller chamber, and a valve dividing said chamber into separate compartments which communicate with the motor, said valve being adjustable to one position to connect one compartment with one port and the other compartment with the other port, and to another position to connect the first-named compartment with the second-named port and the second-named compartment with the first-named port, and to a third position for cutting off communication between the compartments and ports, and provided with a passage for connecting said ports when adjusted to said third position.

4. In hydraulic power transmission, the combination of a motor, an impeller, a valve chamber having a set of ports communicating with the impeller chamber and another set of ports communicating with the motor chamber, and a valve dividing said chamber into separate compartments, each communicating with one of the second-named ports, said valve being adjustable rotarily to connect either of the compartments with either of the first-named ports, and the other compartment with the other first-named port.

5. In hydraulic power transmission, the combination of a motor, an impeller, a valve chamber having a set of ports communicating with the impeller chamber and another set of ports communicating with the motor chamber, and a valve dividing said chamber into separate compartments, each communicating with one of the second-named ports, said valve being adjustable rotarily to connect either of the compartments with either of the first-named ports and the other compartment with the other first-named port, and also to cut off communication between said compartments and first-named ports, the valve being provided with a diametric passage therethrough for connecting the first-named ports when communication between them and the compartments is cut off.

In witness whereof I have hereunto set my hand this 22nd day of June, 1914.

WILLARD E. LAPE.

Witnesses:
H. E. CHASE,
EVA E. GREENLEAF.